United States Patent [19]

Slater

[11] Patent Number: 5,325,707

[45] Date of Patent: Jul. 5, 1994

[54] AIR FILTER CONDITION INDICATOR

[76] Inventor: Harry F. Slater, P.O. Box 617, Suisun City, Calif. 94585

[21] Appl. No.: 28,555

[22] Filed: Mar. 8, 1993

[51] Int. Cl.$^5$ .............................................. G01M 3/00
[52] U.S. Cl. ...................................... 73/40; 73/38
[58] Field of Search ............... 116/268, 60, 67 R, 17.4; 340/607; 73/40, 38, 744, 745, 746, 714

[56]  References Cited

U.S. PATENT DOCUMENTS

| | | | |
|---|---|---|---|
| 2,921,157 | 1/1966 | Stein | 340/607 |
| 3,934,543 | 1/1976 | Howard | 116/67 R |
| 3,950,998 | 4/1976 | Murphy, Jr. et al. | 73/714 |
| 4,669,317 | 6/1987 | Delajoud | 73/745 |
| 4,970,899 | 11/1990 | Huang | 73/744 |

Primary Examiner—Hezrone E. Williams
Assistant Examiner—J. David Wiggins
Attorney, Agent, or Firm—Edgar W. Averill, Jr.

[57] ABSTRACT

An air filter condition indicator which provides an indication of the degree of clogging of the air filter. The indicator has a housing which supports a cylinder. A balance assembly has a hub member supported by the housing, and a balance lever having a piston rod and piston at one end and a counter weight at the other end. An actuation weight arm extends downwardly from the balance lever and has a movable weight which adjusts the sensitivity of the device. An indicator member held by the hub member on the balance assembly as a fan pulls air through the air filter, one side of the piston is connected to the fan side of the air filter and the other side of the piston is open to ambient air. The amount of movement of the piston is shown by the indicator member.

10 Claims, 3 Drawing Sheets

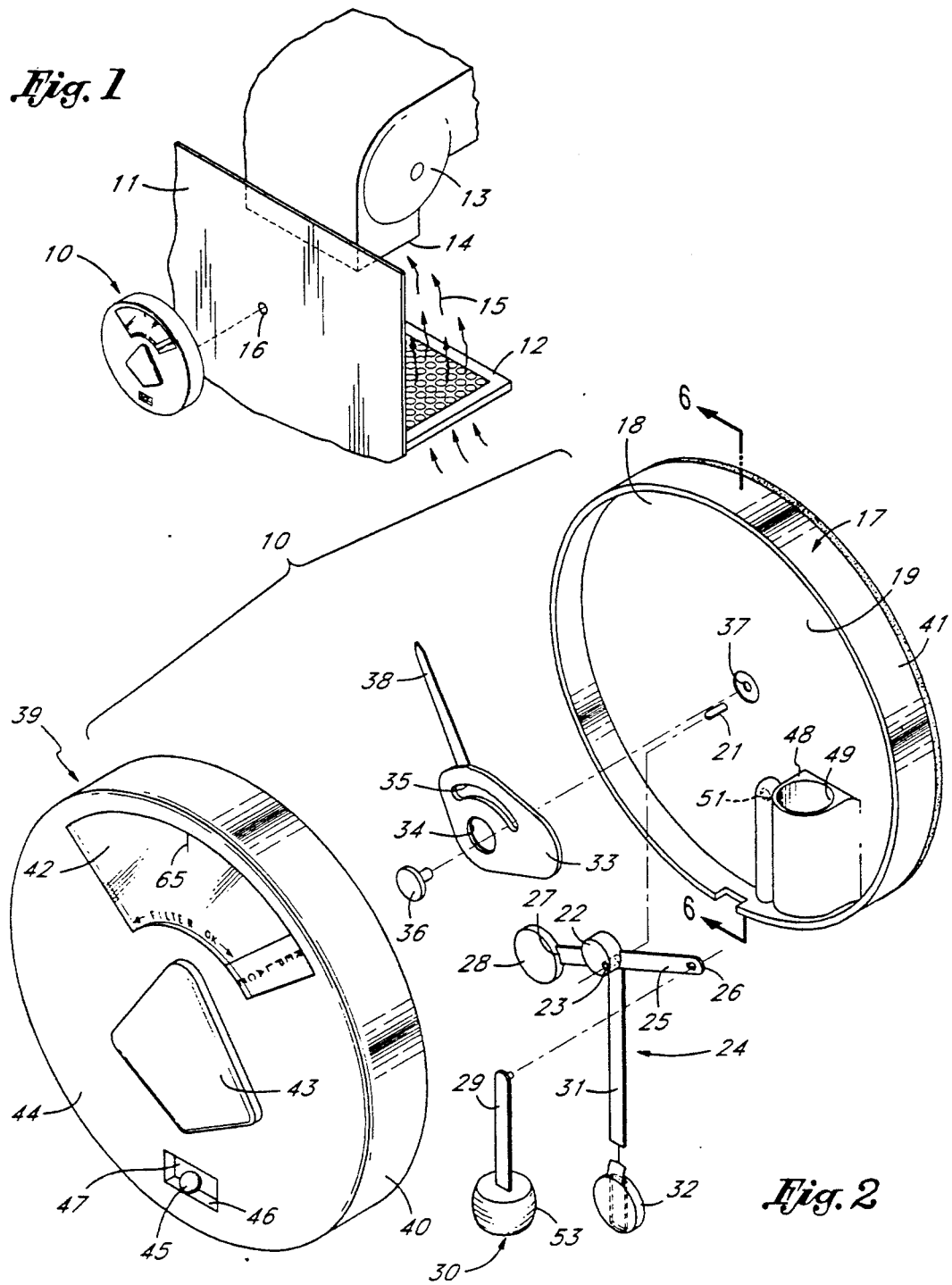

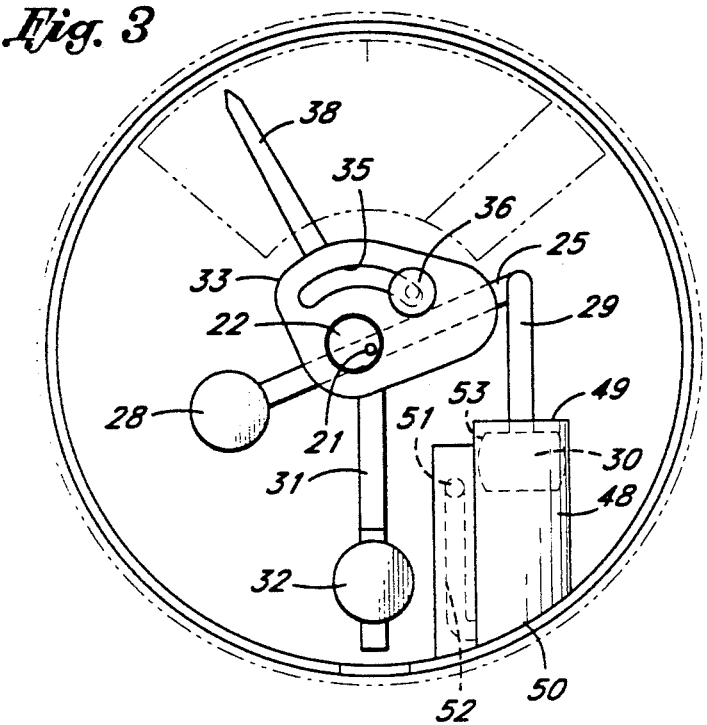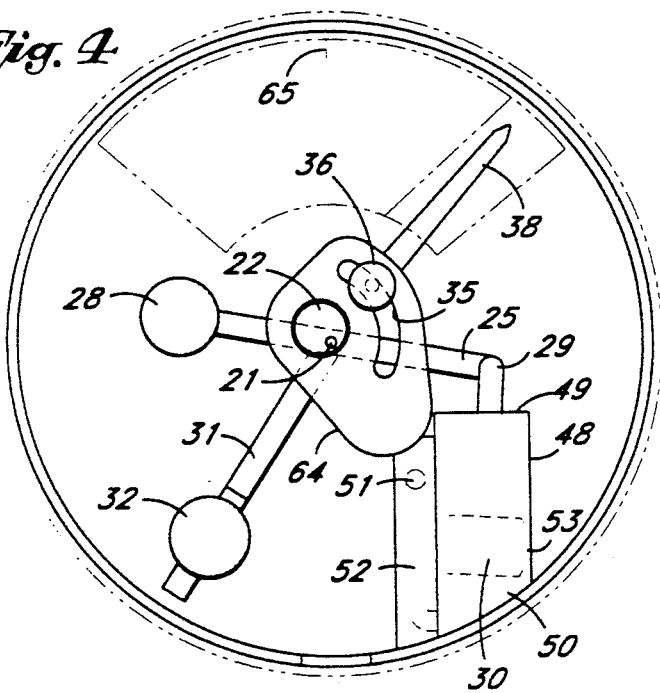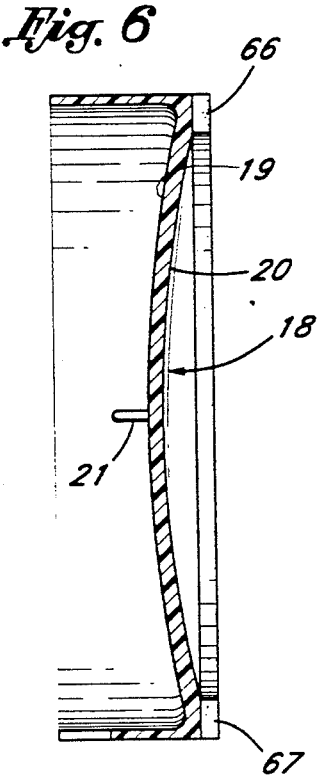

AIR FILTER CONDITION INDICATOR

BACKGROUND OF THE DISCLOSURE

The field of the invention is heating and cooling, and the invention relates more particularly to air treating units such as furnaces, air conditions, humidifiers, and the like which include an air filter which tends to become clogged during use.

Many units have been devised for measuring the slight pressure difference across an air filter to show when the air filter has become clogged. Most of these units utilize a diagram which has the inherent disadvantage of becoming torn as well as providing a relatively expensive assembly. Diaphragm containing units are shown in U.S. Pat. Nos. 3,027,865; 3,916,817, and 3,934,543. A unit utilizing a conical sleeve around the which the air flows, is shown in the U.S. Pat. No. 3,587,515 and a unit which has a switch which is physically closed by the inward bowing of a clogged air filter, is shown in U.S. Pat. No. 3,928,006. All of these units are relatively expensive or are difficult to adjust. All of these units fail to show progressively the filter condition when the fan is off.

SUMMARY OF THE INVENTION

It is an object of the present invention to provide an air filter condition indicator which is inexpensive to manufacture, which may be adjusted to provide different amounts of sensitivity and which is capable of showing easily the filter condition whether the furnace fan (or other unit) is operating or not.

The present invention is for an air filter condition indicator, which provides an indication of the degree of clogging of the air filter being used. The air filter is of the type which is mounted in an air treating apparatus such as a furnace, air conditioner, dehumidifier and the like which has an air fan with an air intake and which provides an air volume between the air intake and the air filter. The indicator of the present invention has a housing with a base plate having a front surface and a back surface. A cylinder member is held by the base plate and a balance assembly support pin is also held by the base plate. A balance assembly is rotatingly held by the support pin and has a hub member from which a generally horizontal balance lever extends. The balance lever has a piston rod and a piston affixed at one end and a counter weight affixed at the other end. An actuation weight arm extends downwardly from the hub member and has an actuation weight thereon. An indicator member is movable in response to rotational movement of the balance assembly, and an air passageway is provided to the cylinder member above and below the piston. One air passage leads to ambient air and the other air passage leads to the volume between the fan intake and the air filter. As the filter becomes more clogged, the piston is pulled further into the cylinder which is a measure of the clogging of the filter. In a preferred embodiment, the indicator member which is affixed to the hub, is an indicator cam member having a curved or arcuate slot through which a retaining stop passes which is held by the base of the housing. As the balance lever moves, the indicator cam moves. Preferably the coefficient of friction between the retaining stop and the arcuate slot in the indicator cam is such that when the fan turns off, the indicator cam retains its deflected position, so that the condition of the filter may be ascertained whether the fan is operating or not.

BRIEF DESCRIPTION OF THE DRAWINGS

FIG. 1 is an exploded perspective view of a furnace with the air filter condition indicator, extended away from the front plate thereof.

FIG. 2 is an exploded perspective view of the air filter condition indicator of the present invention.

FIG. 3 is a front view of the interior of the air condition indicator of FIG. 2, with the indicator in a reset position.

FIG. 4 is a front view of the air filter condition indicator of FIG. 2 with the front of the housing removed and with the indicator showing a clogged air filter.

FIG. 6 is a cross-sectional view taken along line 6—6 of FIG. 2.

DESCRIPTION OF THE PREFERRED EMBODIMENT

Figure 5:
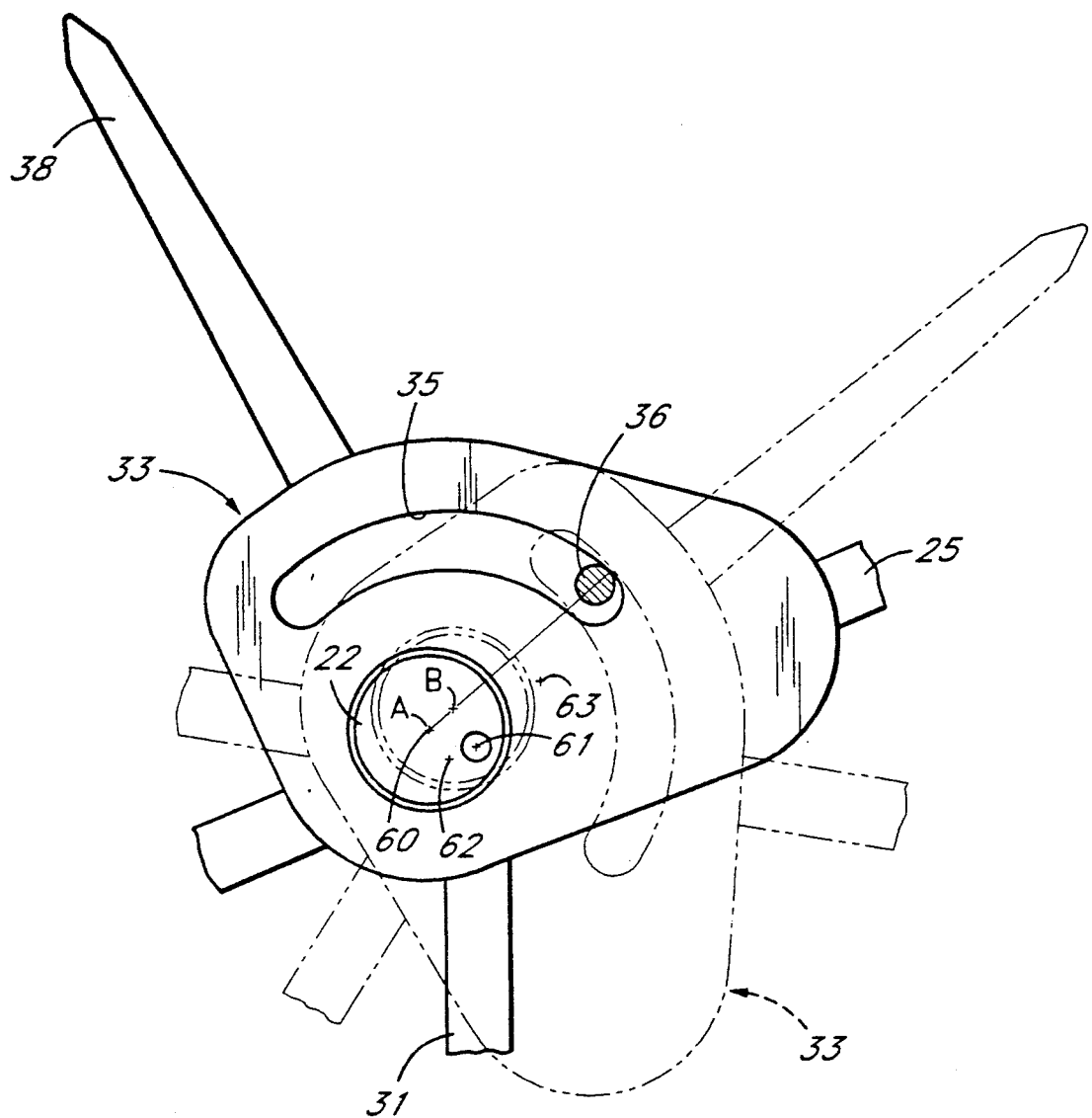
FIG. 5 is an enlarged front view of the indicator cam portion of the air filter indicator of FIG. 2.

The air filter condition indicator of the present invention is shown in FIG. 1 and indicated generally by reference character 10. Indicator 10 is shown separated from front plate 11 of a conventional furnace/air conditioner. An air filter 12 is mounted near the bottom edge of plate 11 and an air fan 13 having an intake 14 pulls air through air filter 12. The air volume between the filter and intake 14 is indicated generally by reference character 15. An opening 16 is formed in front plate 11 over which air filter condition indicator 10 is mounted.

The air filter condition indicator 10 is shown in exploded perspective view in FIG. 2. It has a housing 17 which has a base plate 18 having a front surface 19, and a back surface 20 (shown best in FIG. 6). A support pin 21 is mounted on base plate 18.

A hub member 22 has a support pin bearing opening 23 which permits the balance assembly 24 to be rotatingly held by support pin 21. Balance assembly 24 has a balance lever 25 held by hub member 22. Balance member 25 has a piston end 26 and a counter weight end 27. A counter weight 28 is held on the counter weight end 27, and a piston rod 29 with a piston 30 is pivotally held on the piston end 26 of balance lever 25. An actuation weight arm 31 is also affixed to hub member 22 and an actuation weight 32 is adjustably held thereon. Cylinder 48 is held on base plate 11 and has a first end 49 and a second end 50 shown best in FIGS. 3 and 4. An opening 51 is formed through base plate 18 and an air passageway 52 directs air from opening 51 to the second end 50 of cylinder 48. The piston 30 is shown in FIGS. 3 and 4 and can be seen to have a curved outer edge 53 which permits it to contact the inner walls of cylinder 48 even if the piston rod 29 is misaligned with respect to cylinder 48 as shown in FIG. 4.)

An indicator cam member 33 has a hub member bearing 34 which rotatingly supports indicator cam 33 on hub member 22. An arcuate slot 35 is formed in indicator cam 33 and a retaining stop 36 passes through arcuate slot 35 and into an opening 37 in base plate 18. A pointer 38 extends upwardly from indicator cam 33.

A cover 39 has an outer wall 40 which extends over wall 41 of housing 17. Cover 39, has a window 42 which preferably includes indicia which indicates the meaning of the position of pointer 38. A reset slide 43 is held in a vertical slot in the face 44 of cover 39. Reset slide 43 includes an extending arm (not shown) which contacts indicator cam 33 to move the cam and pointer 38 to its furthest counter clockwise position. A ball bearing 45 is held in a cavity having a bottom ledge 46 and is retained behind a window 47 to indicate when the air filter condition indicator is in a horizontal position.

The particular indicator cam assembly of the present invention has, in its preferred embodiment, means for retaining the indicator cam and its pointer in its deflected position even after the fan 13 is turned off. This is accomplished by a consideration of the friction between retaining stop 36 and arcuate slot 35 combined by the relative positions of the hub center 60, the support pin center 61, the center of curvature 62 of arcuate slot 35, and the center of gravity 63, of indicator cam 33.

As shown best in FIG. 5 as hub 22, turns with the balance lever 25, about its support pin center 61, the hub center 60 moves from position A in FIG. 5 to position B. As it begins to turn, the indicator cam 33 will turn, since its center of gravity 63 is to the right hand side of the center 60 of hub 22. The amount of turning is stopped by contact between retaining stop 36 and the upper edge of arcuate slot 35. It should, of course, be clear that when the fan 13 is operating, the air pressure in the air volume 15 between the fan intake 14 and the air filter 12 decreases, and thus, the pressure at opening 51 and through passageway 52 to the bottom 50 of cylinder 48 decreases. This decrease in pressure pulls piston 30 downwardly as shown in FIG. 4. The actuation weight 32 counter balances this downward move, and, depending upon the location of actuation weight 32 on arm 31, the assembly will reach a stable position. Of course, as the filter becomes further clogged, the partial vacuum at 51 will increase, further pulling the piston 30 downwardly in cylinder 48.

However, as above, when the fan 13 turns off, the unit will stay in the position shown in FIG. 4 because of the friction between retaining stop 36 and arcuate slot 35. Furthermore, after a clogged filter has been replaced, the unit should be reset by moving reset slide 43 upwardly, which contacts the bottom edge 64, of indicator cam 33 moving it back to its initial position shown in FIG. 3. When the unit is first installed and the furnace is turned on with a new filter, it is recommended that actuation weight 32 be adjusted, so that pointer 38 points to a mid-point indicator 65 although weight 32 can be moved upwardly to further increase sensitivity or downwardly to decrease sensitivity.

Preferably as shown in FIG. 6, base plate 18 is curved inwardly with a flat mounting ring 66 at its outer edge. A sponge adhesive ring 67 permits the unit to be mounted on face plate 11 in an airtight manner, thus, exposing opening 51 to the air volume 15 between the filter and the intake 14 of fan 13. It should be pointed out, however, that other mountings are possible since it would be easy to run an air tube from opening 51 to the air volume 15 in the event there is not a vertical face plate 11 as shown in FIG. 1 or the face plate is not in an easily visible location.

While the preferred construction involves the arcuate slot and indicator cam 33 shown in the drawing, it is, of course, possible to show the movement of balance lever 25 in other ways. The essential elements of the indicator of the present invention include the balance lever, piston rod, and piston and cylinder assembly, together with the actuation weight arm and actuation weight. The movement of lever 25 can be indicated by various instruments which could provide a digital readout or other method. The design of the present invention, permits a wide pressure range with a resolution capability of better than 0.010 in. WC. Preferably all of the components except for support pin 21, actuation weight 32 and ball bearing 45, are fabricated from plastic. The design eliminates the need for high precision, low hysteresis diaphragms and linkages, typically used in the past for differential pressure indication. While the mounting surface 11 is preferably vertical, it can be up to about 30° from vertical and still maintain the accuracy of the indicator. The right and left position as indicated by ball bearing 45 should be within 5° of vertical.

When the device is calibrated, as described above by the movement of actuation weight 32, on arm 31 so that the point of 38 indicates point 65 with a clean filter, the needle 38 will reach the "replace" zone when the filter is approximately 40% to 50% clogged. If, instead, it is calibrated about one-third scale, the replace position will be indicated when the filter is approximately 60% to 70% clogged.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. An air filter condition indicator which provides an indication of the degree of clogging of the air filter being checked, said air filter being mounted in an air treating apparatus of the type having an air fan with an air intake, an air volume between said air filter and said air intake of said air fan, said air filter condition indicator comprising:

a housing having a base plate having a front surface and a back surface;

a cylinder member held by said base plate, said cylinder having a first end and a second end;

a balance assembly support pin held by said base plate of said housing;

a balance assembly rotatingly held by said support pin and said balance assembly comprising:

a hub member rotatingly supported on said balance assembly support pin;

a generally horizontal balance lever held by said hub member, said balance lever extending away from said hub, said balance lever having a first end which supports a counterweight and a second end which supports a piston rod;

a piston rod having a piston end and a balance lever end rotatingly supported on the second end of the generally horizontal balance lever, a piston held by the piston end of the piston rod, said piston being positioned in said cylinder member between the first end and the second end thereof;

a counterweight mounted on the first end of the generally horizontal balance lever;

an actuation weight held by said actuation weight arm; an indicator member moveable in response to rotational movement of said balance assembly; and a first air passageway to one of the first and second ends of the air cylinder, said first air passageway being connected to ambient air and a second air passageway to the other of the first and second ends of the air cylinder, said second air passageway being connected to said air volume between said air filter and said fan, whereby said piston and said balance assembly moves in response to a pressure differential across said air filter when said fan is operating.

2. The air filter condition indicator of claim 1 wherein said actuation weight is adjustable up and down on said actuation weight arm to control the amount of movement of said balance assembly for a given pressure differential.

3. The air filter condition indicator of claim 1 wherein the back of the housing has an instrument side and a back side and said back side has an opening connected to the air cylinder below said piston and the back of the housing is mounted in an air tight manner to the outer surface of a plate which has ambient air on the outer surface and the air volume between said filter and said fan, on the inner surface, and said plate has an air passageway located behind said housing.

4. The air filter condition indicator of claim 1 wherein the base plate of said housing is curved away from the back of the housing to form a mounting ring at the outer periphery of the base of the base plate.

5. The air filter condition indicator of claim 1 wherein said piston is a spherical section so that the sides of the piston contact the cylinder even when the piston rod is misaligned with respect to the cylinder.

6. The air filter condition indicator of claim 1 wherein said hub member has an axial center and its point of support on said balance assembly support pin is offset from the axial center of the hub member and said indicator member is rotatingly supported on said hub member by a hub bearing and rotates about the axial center of said hub member and said indicator member has a pointer visible from the exterior of the housing and the indicator member moves in response to the turning of the hub member.

7. The air filter condition indicator of claim 4 wherein said indicator member has a center of gravity separated from said hub bearing and said indicator member has an arcuate slot having edges, said arc having a center of curvature in said hub member but below the axial center of the hub and closer to the balance assembly support pin and a retaining stop member is held by the base plate of said housing and passes through the arcuate slot in said indicator member whereby the movement of said indicator member is a multiplied movement of said hub member.

8. The air filter condition indicator of claim 7 wherein the coefficient of friction between the retaining stop member and the edges of said arcuate slot are sufficient to hold the indicator member in a deflected position even when there is no pressure difference above and below the piston.

9. The air filter condition indicator of claim 8 wherein said housing has a removable cover and said removable cover slidingly holds a reset member operating slide.

10. The air filter condition indicator of claim 7 further including a level indicator affixed to said housing.

* * * * *